United States Patent
Hovis et al.

(10) Patent No.: US 11,209,886 B2
(45) Date of Patent: Dec. 28, 2021

(54) CLOCK FREQUENCY ADJUSTMENT FOR WORKLOAD CHANGES IN INTEGRATED CIRCUIT DEVICES

(71) Applicant: Microsoft Technology Licensing, LLC, Redmond, WA (US)

(72) Inventors: William Paul Hovis, Sammamish, WA (US); Andrew Benson Maki, Woodinville, WA (US); Francine Mary Shammami, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 178 days.

(21) Appl. No.: 16/571,400

(22) Filed: Sep. 16, 2019

(65) Prior Publication Data
US 2021/0081016 A1 Mar. 18, 2021

(51) Int. Cl.
| G06F 1/3206 | (2019.01) |
| G06F 1/08 | (2006.01) |
| G06F 1/324 | (2019.01) |
| G06F 11/34 | (2006.01) |
| G06F 1/26 | (2006.01) |
| G06F 11/30 | (2006.01) |

(52) U.S. Cl.
CPC ............ *G06F 1/3206* (2013.01); *G06F 1/08* (2013.01); *G06F 1/324* (2013.01); *G06F 1/26* (2013.01); *G06F 11/3062* (2013.01); *G06F 11/3409* (2013.01)

(58) Field of Classification Search
CPC .......... G06F 1/26; G06F 1/324; G06F 1/3206; G06F 11/3062; G06F 11/3409; G06F 1/08

USPC ................................................... 713/300, 322
See application file for complete search history.

(56) References Cited

U.S. PATENT DOCUMENTS

| 6,118,306 | A | 9/2000 | Orton et al. |
| 6,762,629 | B2 | 7/2004 | Tam et al. |
| 7,131,016 | B2 | 10/2006 | Oh et al. |
| 9,442,552 | B2 | 9/2016 | Ries et al. |
| 9,773,344 | B2 | 9/2017 | Aelion et al. |
| 10,255,106 | B2 | 4/2019 | Farazmand et al. |
| 10,348,281 | B1 * | 7/2019 | Oliver ............... H03K 19/00369 |
| 2004/0017234 | A1 * | 1/2004 | Tam ...................... G06F 1/324 327/141 |
| 2015/0002217 | A1 * | 1/2015 | Graf .......................... G05F 1/46 327/540 |
| 2015/0378412 | A1 * | 12/2015 | Suryanarayanan ... G06F 9/3824 713/340 |
| 2016/0370837 | A1 | 12/2016 | Shi et al. |
| 2017/0329391 | A1 * | 11/2017 | Jaffari ................... G06F 1/3206 |

(Continued)

OTHER PUBLICATIONS

"International Search Report and Written Opinion Issued in PCT Application No. PCT/US20/038308", dated Sep. 25, 2020, 11 Pages.

*Primary Examiner* — Ji H Bae

(57) ABSTRACT

Clock control arrangements for integrated circuit devices are discussed herein. In one example, a method of operating an integrated circuit device includes monitoring indications of pending operations for a processing core of an integrated circuit, and determining a predicted change in workload for the processing core based at least on a portion of the indications of the pending operations. The method also includes altering a clock frequency of a clock signal provided to the processing core based at least on the predicted change in the workload.

18 Claims, 6 Drawing Sheets

(56) References Cited

U.S. PATENT DOCUMENTS

| | | |
|---|---|---|
| 2019/0041946 A1 | 2/2019 | Wallichs |
| 2019/0265779 A1* | 8/2019 | Gelman .................. G06F 1/305 |
| 2019/0272002 A1 | 9/2019 | Seenappa et al. |
| 2019/0310698 A1* | 10/2019 | Mehra ..................... G06F 1/305 |
| 2019/0377405 A1* | 12/2019 | Uan-Zo-li ............. G06F 1/3206 |

* cited by examiner

CLOCK FREQUENCY ADJUSTMENT FOR WORKLOAD CHANGES IN INTEGRATED CIRCUIT DEVICES

BACKGROUND

Integrated circuit devices, such as central processing units (CPUs), graphics processing units (GPUs), or system-on-a-chip (SoC) devices can be employed in computing systems. These integrated circuit devices can have various clock distribution elements to provide for synchronous operation of logic circuitry, processing cores, controllers, and communication elements. In modern integrated circuit devices, operating frequencies and operating temperatures are significant design concerns. Processing cores, controllers, and communication elements of integrated circuit devices are typically designed to operate at predetermined and fixed operating frequencies based upon worst case conditions for the integrated circuit device. Increasing operating frequencies can often times lead to increased performance of associated circuitry of an integrated circuit device, but can also be accompanied by increased operating temperatures. Another barrier to increasing integrated circuit operating frequency is transient response and stability of the voltage domains supplying various processing cores that form the integrated circuit device. These processing cores, among other on-chip components, can have workload-driven power demands that vary rapidly and across a large power consumption range. As these power demands change quickly over time, voltage levels can experience dips or spikes, potentially leading to operational failures of at least the processing units. Thus, operating voltages and operating frequencies are typically set to conservative values that allow the integrated circuit device to tolerate the workload-based power demands and temperature constraints.

OVERVIEW

Clock control arrangements for integrated circuit devices are discussed herein. In one example, a method of operating an integrated circuit device includes monitoring indications of pending operations for a processing core of an integrated circuit, and determining a predicted change in workload for the processing core based at least on a portion of the indications of the pending operations. The method also includes altering a clock frequency of a clock signal provided to the processing core based at least on the predicted change in the workload.

In another example, a circuit includes a processing core; and a control circuit. The control circuit is configured to monitor indications of pending operations for the processing core, and determine a predicted change in workload for the processing core based at least on a portion of the indications of the pending operations. The clock circuit is also configured to alter a clock frequency of a clock signal provided to the processing core based at least on the predicted change in the workload.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
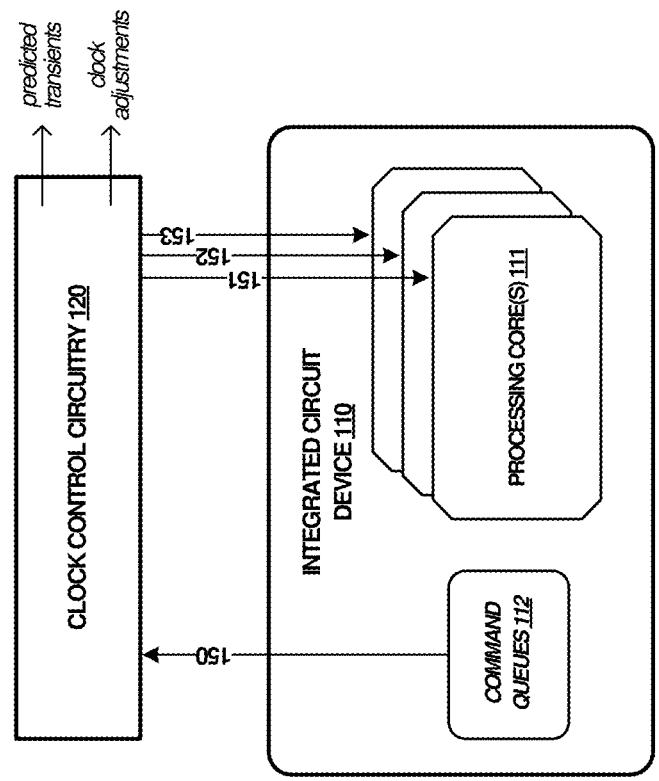
FIG. 1 illustrates a computing system in an implementation.

In large-scale integrated circuit devices, such as system-on-a-chip (SoC) and computer processor designs, transient response and stability of voltages across distribution elements supplying power to execution units can be a concern. These distribution elements can comprise power delivery networks that distribute and deliver voltages/currents from external sources to on-die circuitry. As execution units operate, current draw can vary significantly and can change rapidly over short timeframes. This can be due to the particular set of instructions, commands, or operations that the execution units are presently handling, as well as in operational variations from execution unit to execution unit. Rapid changes in current draw can lead to voltage transients manifested on voltage distribution structures as voltage dips or droops, although voltage spikes may also be possible due to rapid load shedding in certain situations. Decoupling capacitors can be employed in many integrated circuit designs to attempt to reduce the effect of voltage transient events. Decoupling capacitors can be positioned on a circuit board outside of an integrated circuit device, or included as on-die capacitors that accompanies logic circuitry. However, these capacitor placement types can still fail to prevent on-die voltage transients due to relative distances between the capacitors and processing cores as well as limitations on charge delivery timescales. Both techniques also rely on a responsive or reactive approach to supplying charge from decoupling capacitors during fast voltage transients.

Even with the usage of decoupling capacitance, integrated circuit devices can still experience workload-based dips or droops in on-die voltages. Thus, processing, controller, and communication devices are typically designed to operate at a set operating frequency based upon worst case conditions dominated by low voltage transients and high temperature conditions. The enhanced implementations presented here take advantage of the natural transient variations of an integrated circuit device power supply voltage to predictively increase clock speed for periods of time. The examples herein can employ performance counters that provide a predictive indicator of device power usage for one or more power domains of the device. In these examples, clock control circuitry can predict variations in one or more device operating voltages based at least on device activity over a period of time. When the device is at a maximum activity level, then the operating voltages may dip/droop to a lowest transient level, and when the device is at a minimum activity level, then the operating voltages may return to steady-state levels or even experience short duration increases/spikes. However, when low voltage transients are not present on voltage levels (or during lower intensity transients), the examples herein can operate a device at a first operating frequency which is at a higher frequency than during dip/droop events.

Specifically, when lighter levels of activity are detected or predicted, the operating frequency can be increased based upon a higher voltage being present on a particular power domain. These operating voltages normally vary over microseconds (μs), and performance counters can accumulate meaningful information on a microsecond basis, which is somewhat dependent upon the device power delivery network design and the components that are powered off of that network. However, response characteristics of the power delivery network for the device can allow lighter levels of activity over recent history to indicate that a higher voltage is present and a clock frequency can be temporarily increased. The increases in clock frequency can be provided in finite and incremental steps of a base clock frequency, and the examples herein can advantageously add different amounts of clock frequency increases based upon how much voltage increase is anticipated (or measured). For example, if a 10 millivolt (mV) increase in voltage is predicted for a next processing period, then a 1% increase in clock frequency might activated, and if a 20 mV increase in voltage is predicted, then a 2% increase in clock frequency might be activated. By utilizing such an approach, more processing cycles are achieved in a shorter period of time for applications and scenarios where the load activity on the power domain varies over time or never sustains a maximum level. These enhanced architectures and operations can be referred to as a clock compressor circuitry or clock compression operations, and these can provide for an increase in performance of an integrated circuit device during predicted periods of lower current draw or lower power consumption. The clock compression operations employ control software or circuitry to increase clock frequencies by leveraging activity detection, power levels, and/or voltage levels of various cores of integrated circuit devices.

Several other techniques can be employed for integrated circuit devices in addition to, or alternatively from, the clock compression operations. More specifically, these techniques can be used to reduce performance of an integrated circuit device to compensate for voltage dips or droops caused by transient increases in power consumption or current draw. In these techniques, control software or circuitry can determine power levels over time and responsively limit activity of the integrated circuit device, such as thermal activity or throttling, and take advantage of on-device activity counters and accumulated activity over a meaningful period of time (i.e. milliseconds to seconds). The activity limiting or throttling is often accomplished by slowing down a base clock frequency of the device if a maximum activity count is being exceeded. A slower clock rate is then employed until the desired average activity is once again below the threshold, which typically corresponds to return of a voltage level to a normal range from a transient dip/droop. Hysteresis can be employed to prevent the device from changing between clock frequencies more often than is necessary to achieve the desired average thermal results. These activity counters for managing thermal performance can monitor activity a relatively slow time scale, but activity data can also be available on shorter time scales. For example, instantaneous activity can be monitored that reflects instantaneous currents and associated voltages to the device. Indications of this instantaneous activity can be employed in the enhanced implementations discussed herein.

Turning now to a first example implementation, FIG. 1 is presented. FIG. 1 illustrates computing system 100 in an implementation. Computing system 100 includes integrated circuit device 110 and clock control circuitry 120. Integrated circuit device 110 includes processing cores 111 and command queues 112. Integrated circuit device 110 can comprise a central processing unit (CPU), graphics processing unit (GPU), system-on-a-chip (SoC), or other similar integrated circuit device. Processing cores 111 can represent any types of processing elements within integrated circuit device 110, such as execution units, graphics cores, general-purpose processing cores, specialized processing cores, and the like. Although clock control circuitry 120 is shown as separate from integrated circuit device 110 in this example, it should be understood that clock control circuitry 120 can be included in integrated circuit device 110.

In operation, clock control circuitry 120 provides one or more clock signals to integrated circuit device over links 151-153. These clock signals have a corresponding clock rate or clock frequency which indicates a periodic signal used as a clock for various synchronous logic and interface logic of integrated circuit device 110. Typically, the clock frequency of each clock signal will have a base clock rate or operating frequency which might not vary substantially over time. However, in the examples included herein an enhanced operation is provided by clock control circuitry 120. Specifically, clock control circuitry 120 varies a rate or frequency of the clock signals according to one or more factors. These factors include predicted behavior of integrated circuit device 110, which relates to changes in current draw and power consumption by integrated circuit device 110. Voltage domains can employ load line behavior which provides for higher voltage levels in a voltage domain under lighter load, and lower voltage levels in the voltage domain under heavier load. These changes in load are related to current draw or power consumption, which can occur over various timeframes. These timeframes can include both dynamic behavior (short-term), approximately over microsecond timeframes, and static behavior (long-term), approximately over millisecond or greater timeframes. Thus, the term 'transient' as used herein can refer to both short-term and long-term changes. When these changes in load occur over short periods of time, such as in the microsecond timeframes, then voltage transients can be induced on various voltage distribution elements of integrated circuit device 110. If the magnitude of these voltage transients becomes too great, they can lead to malfunction of integrated circuit device 110. For example, if a rapid increase in workload for processing cores 111 of integrated circuit device 110 occurs, then a corresponding rapid increase in current draw can cause voltage supply lines for processing cores 111 to dip or droop. Conversely, when a rapid decrease in workload for processing cores 111 occurs, then a corresponding rapid decrease in current draw can cause voltage supply lines for processing cores 111 to rise or spike.

In the examples herein, clock control circuitry 120 can be employed to take advantage of certain voltage transients and high/low workload states of processing cores 111. By predicting when these transients or changes in load will occur, clock control circuitry 120 can alter clock frequencies of the clock signals applied to processing cores 111. In one example operation, when a change in workload is predicted to decrease current draw for a particular processing core or voltage domain, then clock control circuitry 120 can produce a corresponding increase in clock frequency for that processing core. During the timeframe where the clock frequency has been increased, enhanced performance can be expected for that processing core, due to the increase in clock rate affecting logic and execution rates for the processing core. Also, during changes in workload predicted to increase current draw, clock control circuitry 120 can produce a decrease in clock frequency. However, the examples herein will focus on the increases in clock frequency to increase performance of a processing core.

In FIG. 1, predictive logic of clock control circuitry 120 can be used to monitor command queues 112 of integrated circuit device 110. Command queues 112 might comprise pending operations, upcoming commands, activity counters, command buffers, or other data structures which hold commands and operations to be handled in the future by associated ones of processing cores 111. Based on contents of command queues 112 and previously conducted characterization processes, clock control circuitry 120 can predict when workload changes will likely lead to voltage transients or changes for particular processing cores. Clock control circuitry 120 can then use knowledge of upcoming voltage transients to alter clock frequencies of clock signals provided to integrated circuit device 110 over links 151-153. A more detailed discussion on the operations for clock control circuitry 120 and other control circuitry is detailed in FIG. 3 and FIG. 5 below.

Turning now to a detailed discussion on the elements of FIG. 1, integrated circuit device 110 comprises various integrated elements, such as processing cores 111, as well as interfacing logic, power distribution structures, clock distribution structures, and the like. Integrated circuit device 110 can be an example of a microprocessor, CPU, GPU, SoC, application-specific integrated circuit (ASIC), field-programmable gate array (FPGA) tensor processing unit (TPU), or baseband processing unit (BBU), among other analog and digital integrated circuits. Processing cores 111 of integrated circuit device 110 can comprise various execution cores, general-purpose processing cores, graphics processing cores, digital signal processing (DSP) cores, application-specific integrated circuit (ASIC) cores, tensor processing cores, and artificial intelligence processing cores. Integrated circuit device 110 is formed using various semiconductor manufacturing processes, such as employed in semiconductor wafer fabrication. Integrated circuit device 110 can comprise silicon-based circuit, but might also include other types of semiconductor materials as well as associated conductive interconnect. Integrated circuit device 110 includes various layers, logic devices, interconnect, metallization, processing cores, and interfacing circuitry. Integrated circuit device 110 comprises one or more power domains, each having a characteristic voltage level and voltage distribution network. Integrated circuit device 110 comprises one or more clock domains, each having a characteristic clock distribution network. Integrated circuit device 110 can be coupled to a system board, such as a motherboard, comprising system circuit board for integration into a computing system using a chip carrier or chip package. Various support circuitry (not shown for clarity), such as memory, storage, peripherals, power supplies, and other related circuitry, can be included on such a system board, also referred to as a motherboard.

Clock control circuitry 120 can comprise one or more microprocessors and other processing circuitry. Clock control circuitry 120 can retrieve and execute software or firmware to operate as described herein. Clock control circuitry 120 can be implemented within a single processing device but can also be distributed across multiple processing devices or sub-systems that cooperate in executing program instructions. Examples of clock control circuitry 120 include general purpose central processing units, application specific processors, and logic devices, as well as any other type of processing device, combinations, or variations thereof. In some examples, clock control circuitry 120 comprises a processing core, control core, a hardware security module (HSM), hardware security processor (HSP), security processor (SP), trusted zone processor, trusted platform module processor, management engine processor, microcontroller, microprocessor, FPGA, ASIC, application specific processor, or other processing elements.

Clock control circuitry 120 also comprises one or more clock generation circuitry as well as clock frequency adjustment circuitry. Clock control circuitry 120 can include prediction logic, processor workload characterization algorithms, and various control logic, circuitry, and processing elements. Moreover, clock control circuitry 120 include interfacing elements to communicate with command queues 112 of integrated circuit device 110. The clock generation circuitry and clock frequency adjustment circuitry can include clock generators, various types of oscillators, ring oscillators, voltage controlled oscillators, crystal oscillators, phase-locked loops (PLLs), and other clock generation circuitry. Clock control circuitry 120 might also monitor current, voltage, or power status of integrated circuit device 110, such as using various power supply or voltage regulation circuitry that reports present values of current and voltage, along with any associated filtering, sensing, and analog-to-digital (ADC) conversion circuitry.

Figure 2:
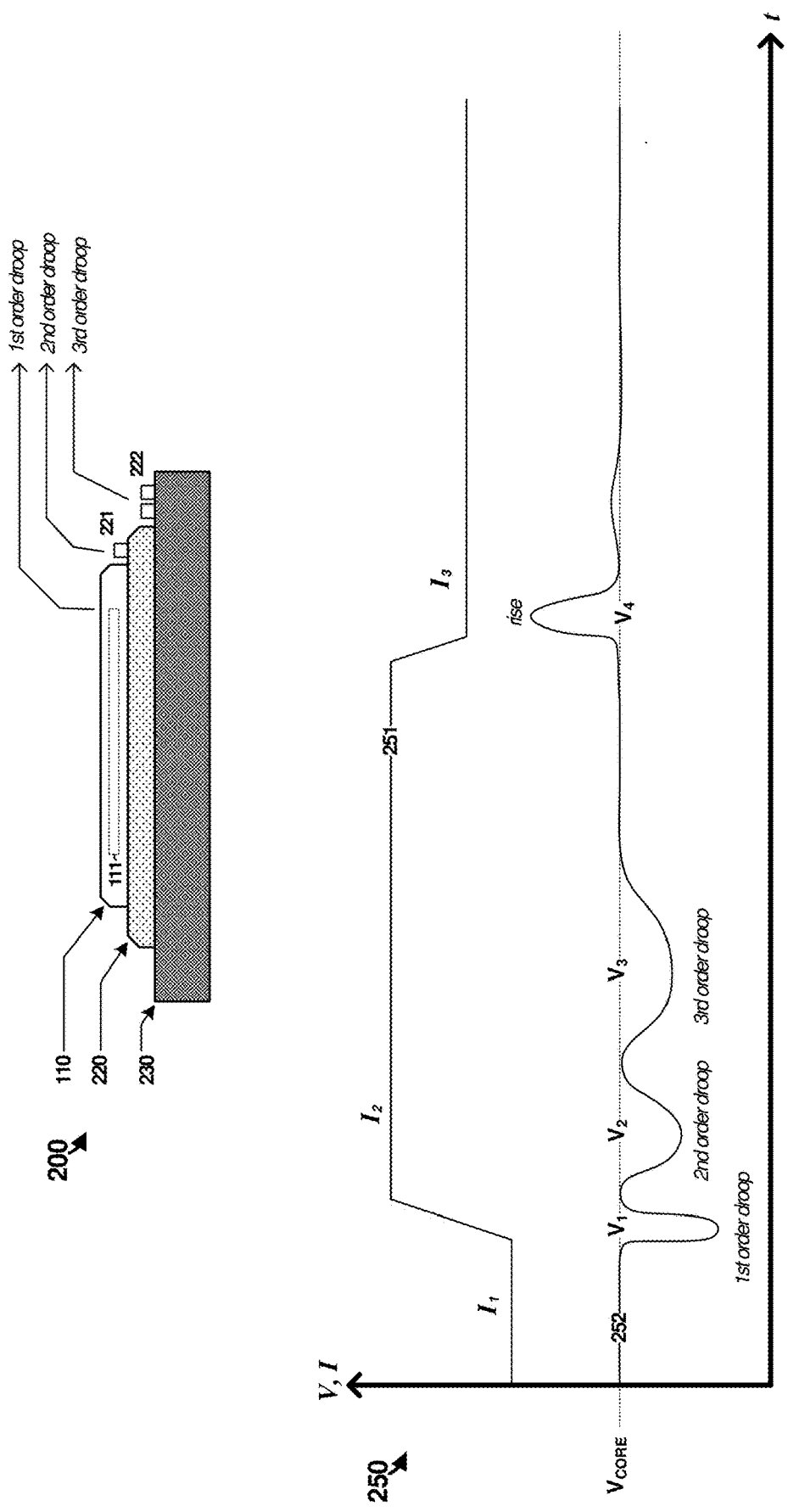
FIG. 2 illustrates example power transients in an implementation.

Turning now to a brief discussion on the various transient effects which can be experienced by an integrated circuit device, FIG. 2 is presented. FIG. 2 illustrates assembly 200 in an implementation. Although some similar elements as found in FIG. 1 are represented by the elements in FIG. 2, it should be understood that other elements can instead be included. Also, many elements in FIG. 2 are not drawn to scale, and instead are sized to enhance clarity in the associated discussion.

Assembly 200 illustrates an example stackup among system assembly 230, package assembly 220, integrated circuit device 110, and processing cores 111. Some examples might also include element 120 from FIG. 1 into integrated circuit device 110. System assembly 230 is shown having a system circuit board, such as a motherboard, with one or more perimeter decoupling capacitors 222. Further circuitry can be included in system assembly 230, such as memory, storage, peripherals, power distribution circuitry, and other similar elements. These are not shown in FIG. 2 for clarity. Integrated circuit device 110 comprises a semiconductor die which is bonded to a carrier circuit board of package assembly 220. This configuration might comprise a flip-chip configuration, although other configurations are possible. Solder balls or solder bumps can couple integrated circuit device 110 to the carrier circuit board to form package assembly 220, along with other circuitry which might include perimeter decoupling capacitors 221. Package assembly 220 is also coupled using solder balls or solder bumps to the system circuit board of system assembly 230.

Various areas of integrated circuit device 110 can benefit from having nearby decoupling capacitance, due in part to having dynamic operation with high power demand and susceptibility to voltage transients. Example areas of integrated circuit device 110 include processing cores, graphics cores, input/output cores, memory bus cores, and other similar elements—represented by processing cores 111 in FIG. 2. Some areas of the device may be somewhat immune from such concerns, due to either low power demands overall or having consistent power demand that varies little and thus corresponds to low transients. Decoupling capacitors 221 and 222 are shown as exemplary decoupling capacitance for integrated circuit device 110, and are placed around a perimeter of integrated circuit device 110 or package assembly 220. Other positioning of decoupling capacitance is possible, such as within a semiconductor die of integrated circuit device 110, in a separate semiconductor die bonded onto integrated circuit device 110, or below a footprint of integrated circuit device 110. However, for the purposes of this discussion, perimeter decoupling capacitance is sufficient.

System assembly 230 comprises one or more printed circuit boards (PCBs) or circuit card assemblies (CCAs) formed using various circuit board manufacturing processes. System assembly 230 can comprise a computing system motherboard or daughterboard in many examples. System assembly 230 can include circuit boards as well as components mounted to the circuit boards. In FIG. 2, system assembly 230 includes an exemplary system circuit board, although other configurations are possible. The system circuit board can comprise fiber-infused dielectric materials, such as fiberglass, FR4, or various composite materials. The system circuit board comprises two surfaces or sides as well as several layers of alternating insulating board material and conductive interconnect or traces formed with metal etchings or printed conductive features. The system circuit board can include one or more power distribution layers/planes or grounding layers/planes which form one or more layers of the associated circuit board. The system circuit board can include labeling/screen printing, solder mask material, and chassis mounting features.

Package assembly 220 comprises an integrated circuit package which includes a carrier comprising a printed circuit board, typically smaller than that of system assembly 230. Package assembly 220 can comprise similar materials as system assembly 230, such as layers of insulating and conductive materials with associated traces, planes, routing, vias, and the like. Package assembly 220 couples to system assembly 230 via one or more solder bumps or solder features, such as controlled collapse chip connections (C4). Typically, pins and sockets are not employed for package assembly 220, but in some examples are possible. Package assembly 220 can comprise a flip-chip assembly when fitted with an associated die of an integrated circuit, such as integrated circuit device 110. Package assembly 220 has a first surface or side (referred to as a die side) which couples to integrated circuit device 110 and a second surface or side (referred to as a land side) which couples to a system assembly PCB via solder features, such as conductive pads and solder balls.

Decoupling capacitors 221 and 222 can be included on a system circuit board within system assembly 230. Capacitors 221 and 222 can comprise surface mount, multilayer ceramic capacitors (MLCCs), through-hole, or other types of discrete capacitors. Capacitors 221 and 222 can be of various sizes, such as 0201, 0402, or 0603 size surface mount capacitors, among others.

FIG. 2 also includes graph 250. Graph 250 illustrates transient response behavior of elements of assembly 200 during operation of integrated circuit device 110. For purposes of illustration, graph 250 shows a series of voltage dips/droops and spikes/rises as example voltage transients.

In graph 250, a current supplied to a voltage domain of integrated circuit device 110 is shown in the top plot 251 as experience a series of transient changes. The voltage domain might be any voltage domain supplying power to a processing core, graphics core, or other subdivision of integrated circuit device 110. Plot 251 illustrates an initial current for the voltage domain ($I_1$) followed by a rapid increase in current draw for the voltage domain to a resultant current ($I_2$), and then a decrease in current draw for the voltage domain to a final current ($I_3$). Coincident with the current transients in plot 251, transient response of a voltage of the voltage domain is shown in plot 252. Three droops are shown in plot 252, each corresponding to a different 'order' of droop in voltage. Each droop has a corresponding minimum voltage level, indicated by V1 for the first order droop, V2 for the second order droop, and V3 for the third order droop. One rise is also shown in plot 252, corresponding to a rise in voltage. The rise has a corresponding maximum voltage level, indicated by V4.

The origin of the three droops can arise from different sets of decoupling capacitance for integrated circuit device 110. A first set of capacitance might be on-die response to the current increase, such as from on-die capacitance or inherent capacitance from voltage distribution networks of a voltage domain. A second set of capacitance can be from on-package capacitance, such as capacitors 221 on package assembly 220. A third set of capacitance can be from on-board capacitance, such as capacitors 222 on a system board. Each set of capacitance can only supply a portion of the charge needed to fulfill the current requirements from the transition to higher currents, such as to $I_2$. Thus, a first quantity of charge is provided by on-die capacitance, a second quantity of charge is provided by on-package capacitance, and a third quantity of charge is provided by on-board capacitance. Limitations in delivery speed and distance, along with inherent inductance, can limit how fast and how much charge can be delivered into the power domain. Thus, the three droops of plot 252 are experienced by integrated circuit device 110. These droops might lead to malfunction, bit errors, logic reset, or other issues for integrated circuit device 110. In order to counter these voltage droops, a steady state voltage level of the voltage domain is typically increased so that the voltage minimums of the droops never exceed a voltage minimum for the associated circuitry.

Figure 5:
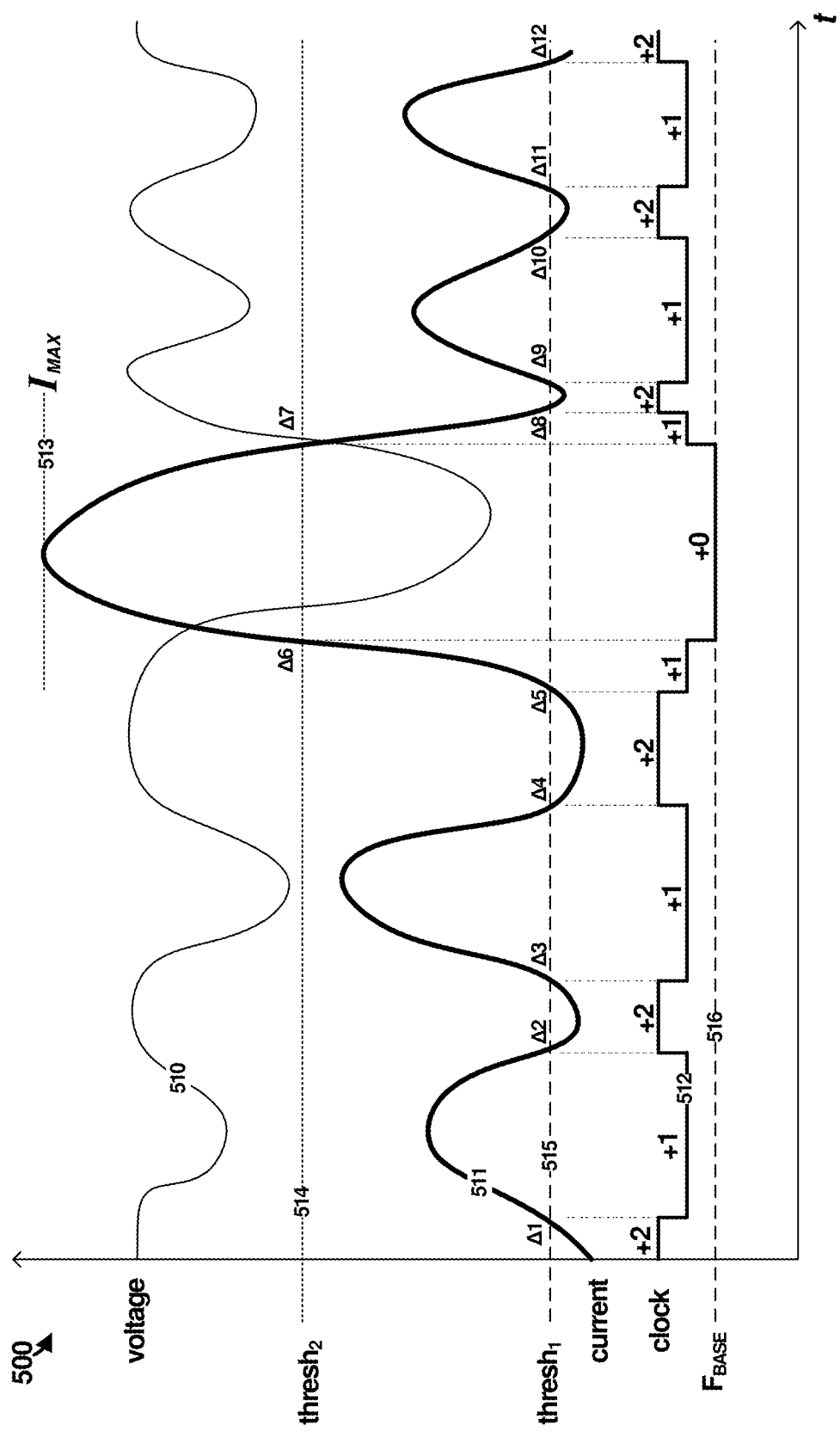
FIG. 5 illustrates operations of a clock compressor in an implementation.

The rise can result from the effects of load shedding by processing cores reflective of the reduction on current draw indicated by $I_3$. This load shedding corresponds to a rapid decrease in current draw or power consumption, and has the effect of a rise or spike transient in voltage for the voltage domain. During these transient periods of voltage rise, due in part to a reduction in current draw by associated processing cores, an increase in clock frequency can be applied to the processing cores. This increase in clock frequency, although temporary, still provides for significant increase in performance for the processing cores. Moreover, most clock frequencies are in the realm of nanosecond periods, whereas the transients in current draw are typically in the realm of microseconds to milliseconds in duration. Thus, hundreds or thousands of clock cycles might be affected by the increased clock frequency. Although short-term transients in current draw are shown in FIG. 2, it should be understood that the increase in clock frequency can last for a longer duration than the transient rise, and can correspond to longer-term changes in loading or current draw for a particular voltage domain. For example, the increase in clock frequency can occur until an increase in workload or current draw is predicted or detected. Further examples on this transient behavior and clock alteration is shown in FIG. 5.

Figure 3:
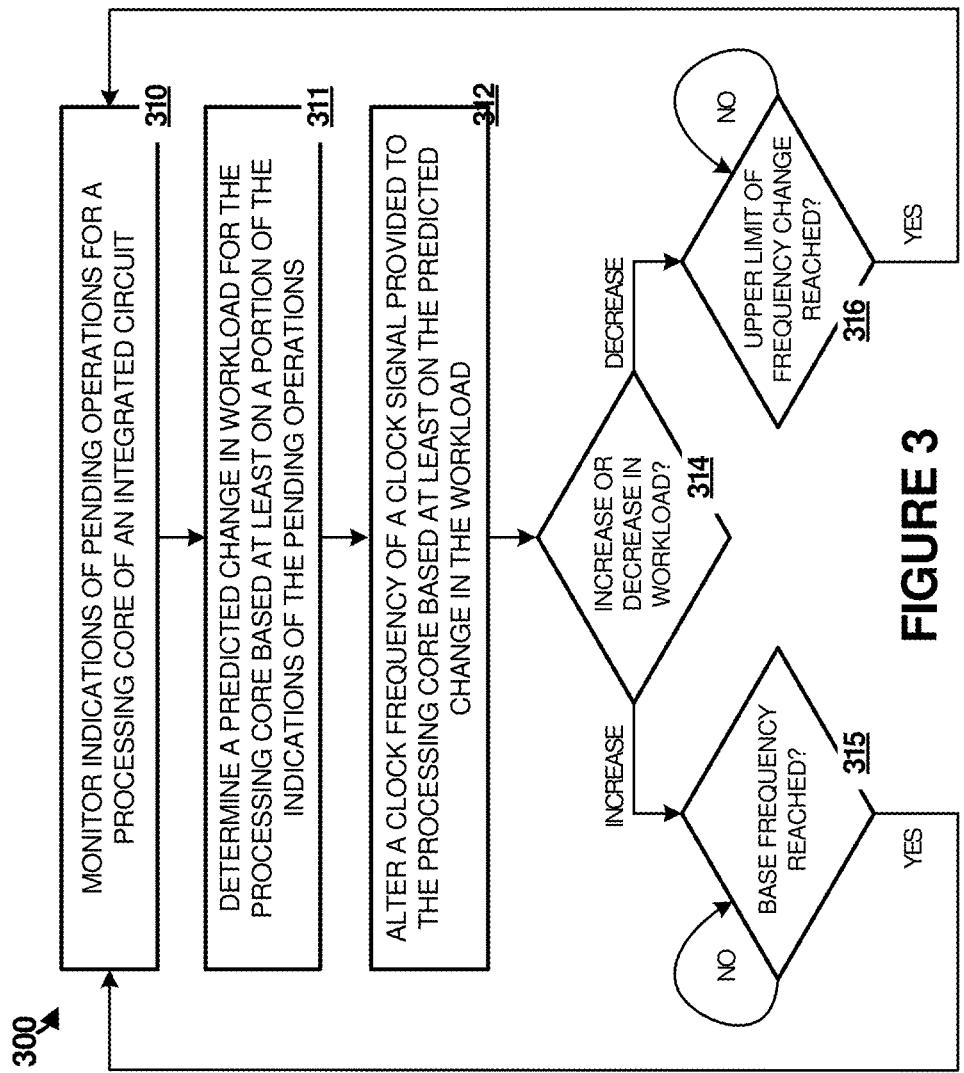
FIG. 3 illustrates operations of a clock control system in an implementation.

Turing now to example operations for increasing or altering clock frequency for processing cores, FIG. 3 is presented. FIG. 3 illustrates operations 310 for elements of FIG. 1, such as for clock control circuitry 120, among other elements. In FIG. 3, a clock boost or clock compression scheme is detailed which can increase a clock frequency for elements of integrated circuit device 110. Conversely, a clock stretching or reduction scheme can also be applied to decrease a clock frequency for elements of integrated circuit device 110. The clock alteration techniques employ an enhanced predictive process, which anticipates changes in workload of elements of integrated circuit device 110 and enables changes in frequency to be closely matched both in time and in magnitude to changes in workload.

In FIG. 3, clock control circuitry 120 monitors (311) indications of pending operations for a processing core of an integrated circuit. In FIG. 1, command queues 112 relate to pending or upcoming operations, activities, or commands for processing cores 111. Clock control circuitry 120 can monitor pending operations or activity counters for processing cores 111 by monitoring over link 150 one or more data structures or buffers that comprise command queues 112. Command queues 112 might proactively transfer indications of the contents of command queues 112 to clock control circuitry 120, or clock control circuitry 120 might query command queues 112 to determine contents.

Clock control circuitry 120 determines (312) a predicted change in workload for processing cores 111 based at least on a portion of the indications of the pending operations. As a part of the prediction process, clock control circuitry 120 can perform one or more previous characterization operations. Clock control circuitry 120 can monitor a plurality of the indications of the pending operations over a period of time to derive workload predictions for processing cores 111 based at least on patterns between changes in power consumption for processing core 111 and corresponding pending operations. Individual operations or commands might be related to incremental changes in workload, power consumption, or current draw for individual processing cores. These relationships can be stored for later use during normal operation, such as in a table or other data structure.

Clock control circuitry 120 can also apply individual weightings to the pending operations to establish predicted power draw of each of the pending operations, and combine the predicted power draw of the individual ones of the pending operations to determine the predicted change in the workload for the processing cores. For example, certain operations might relate to certain incremental increases in workload, power, or current for a particular processing core. These incremental increases can be associated with the operations so that when many operations of various types are encountered in command queues 112, clock control circuitry 120 can add or sum contributions from each command or operation to form a prediction for changes in workload, changes in current draw, or changes in power consumption. Moreover, clock control circuitry 120 might further relate these changes to transients in voltage levels provided to various processing cores. The transients in voltage levels can be specific to each individual integrated circuit device, motherboard, chip carrier package, and decoupling capacitor arrangement. Thus, a characterization process can be performed not only globally for any system with integrated circuitry device 110, but also to each final assembly in situ.

Responsive to the predicted change in workload, clock control circuitry 120 alters (313) a clock frequency of a clock signal provided to one or more processing cores based at least on the predicted change (314) in the workload. As mentioned above, the change in workload might correspond to a particular change in current, power, or voltage on a short-term or long-term basis. The frequency of clocks applied to affected processing cores can be increased or decreased in a corresponding manner to each predicted workload change. In one example, the predicted change in the workload corresponds to a decreased workload for the affected processing core initiating a transient rise in supply voltage applied to the processing core, and clock control circuitry 120 can increase the clock frequency applied to that processing core in accordance with the transient rise in the supply voltage. In another example, clock control circuitry 120 can reduce the clock frequency responsive to the predictive change in the workload indicating an increased workload for the processing core above a threshold workload initiating a transient fall in the supply voltage. Similar changes to clock frequency can occur for longer-term or steady-state changes in supply voltages, such as according to load-line operation where voltage domain voltage levels can rise during light loads and fall during heavy loads. Clock control circuitry 120 may control clock frequencies over microsecond or millisecond events of changes in activity. Clock control circuitry 120 could also employ clock compression techniques in combination with or superimposed with clock stretching techniques to keep the compressed clock effects active for longer periods of time.

In a further example, clock control circuitry 120 can establish one or more power consumption thresholds for processing cores 111, where each power consumption threshold corresponds to a different workload level for each processing core. Based on the predicted change in the workload indicating power consumption of a particular processing core is projected to fall below a first power consumption threshold, clock control circuitry 120 can increase the clock frequency by a predetermined amount approximately commensurate in time with the power consumption falling below the first power consumption threshold. Based on the power consumption initially falling below the first power consumption threshold and the predicted change in the workload subsequently indicating the power consumption is projected to rise above a second power consumption threshold, clock control circuitry 120 can decrease the clock frequency by the predetermined amount approximately commensurate in time with the power consumption rising above the second power consumption threshold.

The adjustments to clock frequency might be bounded to occur only in predetermined increments, or might be bounded by one or more maximum or minimum limits. These limits might include setting a minimum frequency limit as the base clock frequency for normal or steady-state operation of a processor core. During decreases in clock frequency that are responsive to predicted increases in workload, continued decreases in clock frequency can be halted when a base frequency is reached (315). During increases in clock frequency that are responsive to predicted decreases in workload, continued increases in clock frequency can be halted according to several factors (316). A predetermined frequency limit might be established based on characterization of the processing cores which indicates a maximum operating frequency for a given temperature and supply voltage. In other examples, a live or real-time frequency limit can be established using various circuitry. This circuitry can include one or more ring oscillator structures which are tuned to fail if too high of a frequency is reached, but before the affected processing core fails. Clock control circuitry 120 can thus determine at least one frequency limit for incremental increases of a clock frequency based at least on monitoring operation of a ring oscillator for failure indications of the ring oscillator.

In yet another example operation, a voltage control system or power system can operate processing cores 111 with at least one supply voltage having a voltage margin below a manufacturer specified voltage level. This voltage margin and voltage level can be determined using various performance tests in context with other circuitry associated with integrated circuit device 110. Clock control circuitry 120 can then determine magnitudes of incremental increases in clock frequencies of the clock signals based at least on the voltage margin for a particular processing core. Specifically, if more voltage margin is determined for a particular processing core, then clock control circuitry 120 can allow the frequency for that particular processing core to increase further than another processing core with less voltage margin.

Advantageously, clock control circuitry 120 can dynamically control clock rates or clock frequencies of processing cores 111 of integrated circuit device 110. These dynamic changes in clock frequencies can be based on predicted behavior of processing cores 111, and the changes are typically made to coincide with the changes in behavior, such as to coincide in time with changes in power consumption or current draw. This predictive operation provides advantages over reactive behavior, such as having the ability to apply frequency changes in a proactive manner and avoid latencies or delays associated with monitoring current or voltage in real-time to then affect changes in frequency. Decreases in frequency which accompany increases in workload for a processing core can lead to more stable performance of the processing core by having voltage dips/droops reduced or eliminated. Moreover, by reducing or eliminating voltage dips/droops for a processing core, then the voltage supplied at a steady-state to that processing core can typically be reduced. This reduction in supply voltage is due in part to reducing or eliminating the need for a voltage level to be established that tolerates large downward voltage transients without dropping below a failure threshold of the processing core. Increases in frequency which accompanies decreases in workload for a processing core can lead to higher performance for the processing core. A larger quantity of clock cycles can be fit into a given period of time, allowing various logic and execution elements of a processing core to accomplish more tasks in that given amount of time than would be normally possible if the clock frequency remained unchanged. Moreover, this rapid change in clock frequency might reduce or eliminate spikes or rises on supply voltages during rapid load shedding due to workload changes of a processing core, leading to more stable operation of that processing core.

Figure 4:
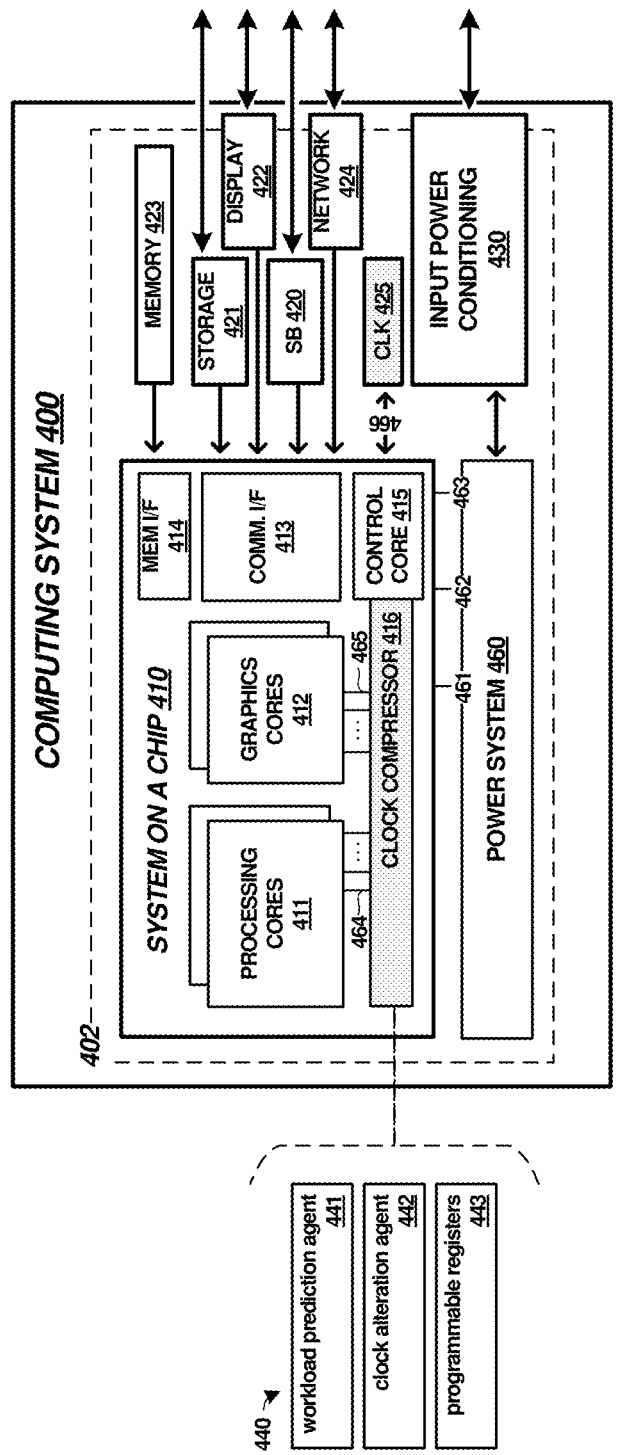
FIG. 4 illustrates a computing system in an implementation.

As another example of the computing systems and integrated circuit devices discussed herein, FIG. 4 is presented. FIG. 4 includes computing system 400. Computing system 400 can be used to implement computing systems, such as integrated circuit device 110 along with element 120 in FIG. 1, although variations are possible. Examples of computing system 400 include, but are not limited to, gaming systems, smartphones, tablet computers, laptops, servers, customer equipment, access terminals, personal computers, Internet appliances, media players, or some other computing apparatus, including combinations thereof. In a specific example, computing system 400 can comprise an Xbox gaming system configured to service interactive gaming applications for end users.

Computing system 400 may be implemented as a single apparatus, system, or device or may be implemented in a distributed manner as multiple apparatuses, systems, or devices. Computing system 400 includes, but is not limited to, system on a chip (SoC) device 410, south bridge 420, storage system 421, display interfaces 422, memory elements 423, network module 424, input power conditioning circuitry 430, and power system 460. SoC device 410 is operatively coupled with the other elements in computing system 400, such as south bridge 420, storage system 421, display interfaces 422, memory elements 423, network module 424. SoC device 410 receives power over power links 461-463 as supplied by power system 460. One or more of the elements of computing system 400 can be included on motherboard 402, although other arrangements are possible.

Referring still to FIG. 4, SoC device 410 may comprise a micro-processor and processing circuitry that retrieves and executes software from storage system 421. Software can include various operating systems, user applications, gaming applications, multimedia applications, or other user applications. SoC device 410 may be implemented within a single processing device, but may also be distributed across multiple processing devices or sub-systems that cooperate in executing program instructions. Examples of SoC device 410 include general purpose central processing units (CPUs), application specific processors, graphics processing units (GPUs), and logic devices, as well as any other type of processing device, combinations, or variations thereof. In FIG. 4, SoC device 410 includes processing cores 411, graphics cores 412, communication interfaces 413, memory interfaces 414, control core 415, and clock compressor 416, among other elements. Some of the noted elements of SoC device 410 can be included in a north bridge portion of SoC device 410. In this example, control core 415 includes elements of clock compressor 416, although variations are possible.

Processing cores 411 comprise various execution cores of a processing unit, such as a central processing unit (CPU) or other similar execution system. Processing cores 411 can comprise execution units and other circuitry to provide arithmetic, logic, system control, and input/output (I/O) operations as specified by instructions included in executed software and operating systems. Graphics cores 412 comprise one or more parallel execution units configured to render graphics or perform similar data manipulation operations. Graphics cores 412 can provide graphics processing and rendering services for processing cores 411 or for software executed by processing cores 411. Processing cores 411 and graphics cores 412 can have one or more voltage domains associated therewith, as well as one or more clock domains.

Communication interfaces 413 comprise various bus style and point-to-point communication interfaces for coupling on-die elements of processing cores 411 and graphics cores 412 to other elements of SoC device 410. These interfaces can include peripheral component interconnect express (PCIe), front-side bus (FSB) interfaces, direct media interfaces (DMI), SMBus interfaces, and other various interfaces to communicate off-chip with external elements. Memory interfaces 414 can comprise various RAM interfaces and memory technology interfaces, such as front-side bus interfaces, and dynamic random access memory (DRAM) interfaces, or non-volatile memory interfaces, such as flash memory interfaces.

Control core 415 comprises a processing core separate from processing cores 411 and graphics cores 412. Control core 415 might be included in separate circuitry, logic, or execution units, or processors external to SoC device 410 in some examples. In this example, clock compressor 416 is included in control core 415, although other examples may have clock compressor 416 as a separate element of SoC device 410 or external to SoC device 410. Control core 415 can comprise one or more microprocessors and other processing circuitry. Control core 415 can retrieve and execute software or firmware, such as firmware comprising voltage control firmware, clock control firmware, power transient characterization firmware, power transient prediction firmware, and voltage optimization or minimization firmware from an associated storage system, which might be stored on portions of storage system 421, RAM 423, or other memory elements. Control core 415 can be implemented within a single processing device but can also be distributed across multiple processing devices or sub-systems that cooperate in executing program instructions. Examples of control core 415 include general purpose central processing units, application specific processors, and logic devices, as well as any other type of processing device, combinations, or variations thereof. In some examples, control core 415 comprises a hardware security module (HSM), hardware security processor (HSP), security processor (SP), trusted zone processor, trusted platform module processor, management engine processor, microcontroller, microprocessor, FPGA, ASIC, application specific processor, or other processing elements.

Control core 415 can instruct voltage regulation circuitry of power system 460 over a control link to provide particular voltage levels for one or more voltage domains of SoC device 410. Control core 415 can instruct voltage regulation circuitry to provide particular voltage levels for one or more operational modes, such as normal, standby, idle, and other modes. Control core 415 can receive instructions via external control links or system management links, which may comprise one or more programming registers, application programming interfaces (APIs), or other components. Control core 415 can provide status over various system management links, such as temperature status, power phase status, current/voltage level status, or other information.

Control core 415 can handle initialization procedures for SoC device 410 during a power-on process or boot process. Thus, control core 415 might be initialized and ready for operations prior to other internal elements of SoC device 410. Control core 415 can execute a voltage minimization process or voltage optimization process for SoC device 410. In other examples, control core 415 can include circuitry to instruct external voltage control elements and circuitry to alter voltage levels provided to SoC device 410, or interface with circuitry external to SoC device 410 to cooperatively perform the voltage minimization process or voltage optimization process for SoC device 410.

Clock compressor 416, which is included in control core 415 in this example, performs various operations with regard to controlling clock rates or clock frequencies applied to elements of SoC device 410. Clock compressor 416 can include workload prediction agent 441, clock alteration agent 442, and programmable registers 443. Clock compressor 416 might comprise separate processing cores or execution units than control core 415, or may comprise firmware or software executed by elements of control core 415, including combinations thereof. Programmable registers 443 are provided for programmable control of clock compressor 416, such as to set clock frequencies, frequency limits, frequency increase/decrease increments, or to provide status of present values of clock frequency or other various clock control status.

Workload prediction agent 441 of clock compressor 416 interfaces with command queues or activity counters of processing cores 411 and graphics cores 412 to monitor upcoming or pending operations, commands, or activity. Workload prediction agent 441 can access this information over one or more links established with the cores and control core 415, which might comprise data buses, control interfaces, push/pull interfaces, or other similar links and interfaces. Workload prediction agent 441 can also monitor power consumption, voltage transients, or current transients over time to correlate specific commands, instructions, or operations of processing cores 411 and graphics cores 412 to the transient states or to steady states. Based on this monitored information, workload prediction agent 441 can make determinations for future activity of the cores to predict transient states or steady states for use by clock alteration agent 442 in altering clock frequencies. Workload prediction agent 441 can interface with power system 460 to determine levels of voltages, currents, or power. Workload prediction agent 441 might include separate monitoring circuitry to monitor performance of one or more voltage domains of SoC device 410.

Clock alteration agent 442 of clock compressor 416 can control one or more clock generation circuits which may be internal to SoC device 410 or external to SoC device 410. In one example, clock compressor 416 interfaces over links 466 with clock generation circuit (CLK) 425. CLK 425 comprises one or more oscillator circuits, phase-locked loop (PLL) circuitry, crystal oscillators, or other elements. CLK 425 provides one or more clock signals to SoC device 410 over links 466 which are then distributed to various processing cores and graphics cores, among other interface and execution elements, by clock compressor 416 over links 464 and 465. Several distinct clock signals can be provided by CLK 425, and each can have different or similar clock frequencies. CLK 425 includes logic and circuitry to alter clock frequencies for clock signals provided to SoC device 410 based on clock control instructions issued by clock compressor 416 over links 466.

In some examples, clock compressor 416 comprises one or more ring oscillators configured to provide frequency limit indicators for increased clock frequencies for one or more clock domains. As a clock frequency is increased, the ring oscillators can be configured to fail prior to any other circuitry affected by the increased clock frequency, such as processing cores, graphics cores, or other circuitry. In this manner, an upper limit on clock frequency can be determined in real-time using the ring oscillators.

Data storage elements of computing system 400 include storage system 421 and memory elements 423. Storage system 421 and memory elements 423 may comprise any computer readable storage media readable by SoC device 410 and capable of storing software. Storage system 421 and memory elements 423 may include volatile and nonvolatile, removable and non-removable media implemented in any method or technology for storage of information, such as computer readable instructions, data structures, program modules, or other data. Examples of storage media include random access memory (RAM), read only memory, solid state storage devices, magnetic disks, optical disks, flash memory, virtual memory and non-virtual memory, magnetic storage devices, or any other suitable storage media. Storage system 421 may comprise additional elements, such as a controller, capable of communicating with SoC device 410 or possibly other systems.

South bridge 420 includes interfacing and communication elements which can provide for coupling of SoC 410 to peripherals over one or more connectors, such as optional user input devices, user interface devices, printers, microphones, speakers, or other external devices and elements. In some examples, south bridge 420 includes a system management bus (SMBus) controller or other system management controller elements.

Display interfaces 422 comprise various hardware and software elements for outputting digital images, video data, audio data, or other graphical and multimedia data which can be used to render images on a display, touchscreen, or other output devices. Digital conversion equipment, filtering circuitry, image or audio processing elements, or other equipment can be included in display interfaces 422.

Network elements 434 can provide communication between computing system 400 and other computing systems or end users (not shown), which may occur over a communication network or networks and in accordance with various communication protocols, combinations of protocols, or variations thereof. Example networks include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transmission control protocol (TCP), and the user datagram protocol (UDP), as well as any other suitable communication protocol, variation, or combination thereof.

Power system 460 provide operating voltages at associated current levels to at least SoC device 410. Power system 460 can convert an input voltage received over a power connector and input power conditioning elements 430 to different output voltages or supply voltages on links 461-463, along with any related voltage regulation. Power system 460 comprises various power electronics, power controllers, DC-DC conversion circuitry, AC-DC conversion circuitry, power transistors, half-bridge elements, filters, passive components, and other elements to convert input power received through input power conditioning elements 430 from a power source into voltages usable by SoC device 410.

Some of the elements of power system 460 might be included in input power conditioning 430. Input power conditioning 430 can include filtering, surge protection, electromagnetic interference (EMI) protection and filtering, as well as perform other input power functions for input power. In some examples, input power conditioning 430 includes AC-DC conversion circuitry, such as transformers, rectifiers, power factor correction circuitry, or switching converters. When a battery source is employed as input power, then input power conditioning 430 can include various diode protection, DC-DC conversion circuitry, or battery charging and monitoring circuitry.

Power system 460 can instruct voltage regulation circuitry included therein to provide particular voltage levels for one or more voltage domains. Power system 460 can instruct voltage regulation circuitry to provide particular voltage levels for one or more operational modes, such as normal, standby, idle, and other modes. Voltage regulation circuitry can comprise adjustable output switched-mode voltage circuitry or other regulation circuitry, such as DC-DC conversion circuitry. Power system 460 can adjust output voltages provided over links 461-463 as instructed by control core 415. Links 461-463 might each be associated with a different voltage domain or power domain of SoC 410.

Power system 460 can comprise one or more microprocessors and other processing circuitry that retrieves and executes software or firmware, such as voltage control firmware and performance testing firmware, from an associated storage system. Power system 460 can be implemented within a single processing device but can also be distributed across multiple processing devices or sub-systems that cooperate in executing program instructions. Examples of power system 460 include general purpose central processing units, application specific processors, and logic devices, as well as any other type of processing device, combinations, or variations thereof. In some examples, power system 460 comprises an Intel® or AMD® microprocessor, ARM® microprocessor, FPGA, ASIC, application specific processor, or other microprocessor or processing elements.

In some examples, voltage reduction techniques can be applied by control core 415 and other external elements for computing systems and processing devices to determine reduced operating voltages below manufacturer-specified voltages. These reduced operating voltages can lead to associated reductions in power consumption. The voltage adjustment techniques exercise a system processor device, such as an SoC device, in the context of various system components of a computing assembly. These system components can include memory elements (such as random access memory or cache memory), data storage elements (such as mass storage devices), communication interface elements, peripheral devices, and power electronics elements (such as voltage regulation or electrical conversion circuitry), among others, exercised during functional testing of the processing device. Moreover, the voltage adjustment techniques operationally exercise internal components or portions of a processing devices, such as processing core elements, graphics core elements, north bridge elements, input/output elements, or other integrated features of the processing device.

During manufacture of processing devices, a manufacturing test can adjust various voltage settings for a manufacturer-specified operating voltage for the various associated voltage domains or voltage rails of the processing device. When placed into a computing apparatus, such as a computer, server, gaming system, or other computing device, voltage regulation elements use these manufacturer-specified operating voltages to provide appropriate input voltages to the processing device. Voltage tables can be employed that relate portions of the processing device to manufacturer-specified operating voltages as well as to specific clock frequencies for those portions. Thus, a hard-coded frequency/voltage (F/V) table is employed in many processing devices which might be set via fused elements to indicate to support circuitry preferred voltages for different voltage domains and operating frequencies. In some examples, these fused elements comprise voltage identifiers (VIDs) which indicate a normalized representation of the manufacturer-specified operating voltages.

Functional tests can be employed by control core 415 and other external elements to determine reduced operating voltages (Vmins) for a system processor, such as for SoC device 410 with associated processing cores and graphics cores. These functional tests run system-level programs which test not only a processing device, but the entire computing module in which the processing device is installed. Targeted applications can be employed which exercise the computing module and the processing device to ensure that particular processing units within the processing device are properly activated. This can include ensuring that all portions of the processing device are activated fully, a subset of units activated fully, or specific sets of background operations active in combination with targeted power-consuming operations.

The functional tests for processing core portions can include operations initiated simultaneously on all the processing cores (or a sufficient number of them to represent a 'worst' possible case that a user application might experience) to produce both static power demand and dynamic power demand for the processing cores that replicates real-world operations. Distributed checks can be provided, such as watchdog timers or error checking and reporting elements built into the processing device, and are monitored or report alerts if a failure, crash, or system hang occurs. A similar approach can be used for graphics cores, where the functional test ensures the graphics cores focus on high levels of graphic rendering activity to produce worst case power consumption (static and dynamic), temperature rises, on-chip noise, and a sufficient number of real data paths which produce accurate operational Vmins North bridge testing can proceed similarly, and also include memory activity between off-device memory devices and on-chip portions that are serviced by those memory devices.

These power reduction using voltage adjustment processes can employ voltage regulation modules (VRMs) of power system 460 or associated power controller circuitry with selectable supply voltage increments, where the processing device communicates with the VRMs or associated power controller circuitry to indicate the desired voltage supply values during an associated power/functional test or state in which the processing device may be operating.

Once reduced voltage values have been determined, the processing device can receive input voltages set to a desired reduced value from associated VRMs. This allows input voltages for processing devices to be set below manufacturer specified levels, leading to several technical effects. For example, associated power savings can be significant, such as 30-50 watts in some examples, and cost savings can be realized in the design and manufacturing of reduced capacity system power supplies, reductions in the VRM specifications for the processing devices, cheaper or smaller heat sinks and cooling fans. Smaller system enclosures or packaging can be employed. Additionally, the power savings can result in system characteristics that reduce electrical supply demands or battery drain. In addition, the voltage reduction techniques can be applied in conjunction with the enhanced frequency alteration (clock compression) techniques discussed herein to provide for further increases in clock frequency when Vmins are applied lower than manufacturer specified operating voltages.

Turning now to further detailed operations on the clock frequency alteration examples discussed herein, FIG. 5 is presented. FIG. 5 illustrates graph 500 which includes various plots of voltage (510), current (511), and frequency (512) for one or more cores of SoC device 410. These cores might be one or more among processing cores 411 and graphics cores 412, and the term processing core is used in the following discussion to refer to any of cores 411 and 412. Turning first to current plot 510, this plot illustrates changes in current draw for a particular processing core of SoC device 410, which changes over time as current demands of the processing core changes. For the purposes of FIG. 5, plot 511 reflects changes in workload of the processing core. These changes in workload are reflective of various operations or commands that the processing core is presently handling. The operations or commands might comprise arithmetic operations, logical operations, memory operations, register operations, or other various granular operations performed at the physical gate level and logical unit level of a processing core. Various composite commands or operations might be formed from individual granular machine-level instructions, and any such commands, operations, or instructions can play a role in changes in workload for the processing core.

Plot 510 illustrates changes in voltage supplied to the processing core. Although a steady voltage is typically provided by voltage regulators or power systems to the processing core, the dynamic workload produces dips and spikes in voltage distribution networks that supply the voltage to the processing core. The voltage distribution network comprises various traces, supply lines, pins, and conductive semiconductor or metallization on a semiconductor die. Decoupling capacitance can alleviate some of the dips and spikes—referred to herein as transients—but often this decoupling capacitance cannot supply charge into the voltage distribution network quickly enough to eliminate all transients, especially at the semiconductor die level. Thus, commensurate with increases in current draw for a processing core, the voltage for that core can dip or droop. Also, commensurate with decreases in current draw for a processing core, the voltage for that core can spike or rise. FIG. 5 shows several such voltage transients in plot 510 which are commensurate with current transients in plot 511. There may be slight phase delays between plot 511 and plot 510 due to various reactive components of the voltage distribution network, such as parasitic capacitance and inductance, but for illustrative purposes, these phase delays are ignored. It should be understood that although FIG. 5 illustrates short-term transients, longer-term changes current draw can also lead to changes in voltage levels over longer-duration timeframes, according to the load-line operations mentioned herein.

During operation of SoC device 410 in FIG. 4, clock compressor 416 can monitor pending operations for processing cores 411 and graphics cores 412 to determine when changes in workload are anticipated. From the anticipated change in workload, clock compressor 416 can then determine alteration in clock frequency applied over clock signals/links 464-465 to the associated cores. As discussed herein, this process involves predictive logic of workload prediction agent 441 of clock compressor 416, which is further driven by prior characterization of individual operations or activities of the cores to workload changes and real-world measurements of changes in current, power, or voltage. Clock alteration agent 442 of clock compressor 416 can make changes to the clock frequencies. These changes might entail directing instructions or commands to CLK 524 over links 466 which responsively alters one or more clock signals provided over links 466.

In examples where clock compressor 416 is included in control core 415, then elements of control core 415 perform these operations, such as determining the predicted change in workload for the processing cores. Since control core 415 is included on a semiconductor die comprising the processing cores, very quick and responsive changes to the clock frequencies can be provided, as well as close on-die monitoring of pending operations or activity counters for the processing cores. Control core 415 might also include clock generation circuitry which can alter clock frequencies of the clock signals provided to the processing cores.

Returning to graph 500, various example frequency changes are shown in plot 512. Plot 512 illustrates an example to throttle activity above a threshold current (thresh$_1$ 515) on a semi-instantaneous basis to limit changes in current (di/dt) impacts to voltage droops on SoC device 410. By proper prior characterization, monitored current illustrated by plot 511 can be tracked closely to a predicted current. With a load-line approach, the voltage shown in plot 510 does the opposite of the current and droops lower as the current demand goes up (on a microsecond scale basis).

Command queues for graphics cores and activity counters for processing cores can be used as leading indicators of future activity (or inactivity) that can be used to help determine the future direction of current demand (e.g. device activity) and the associated voltage transients. Some approaches to device operation fix a frequency of operation to be associated with the power state in use. This fixed frequency is set based upon the device being at a maximum load and as a result a minimum operating voltage for that particular power state. However, as can be seen from graph 500, much of the time the device is operating at lower levels of demand and thus higher voltages. Thus, clock compressor 416 can anticipate/detect the higher voltages and to allow the clock rate to be increased during those periods of time that are less than maximum demand.

Ideally, command queues act as a predictor of where an activity level will be trending in the future (e.g. up, down, or staying about the same) depending upon what level of activity is currently occurring. Activity counters can provide the information on how much current and thus power is being consumed within a voltage domain, and as a result the transient voltage level being supplied. Although there is flexibility around the amount of time to react to lower levels of activity, detection of low activity and high voltage transients signals clock compressor 416 to increase the clock frequency. The more quickly this change in clock frequency can be done, the greater the overall performance gain that can be realized for a particular processing core. Clock compressor 416 can detect the situation where the clock frequency has been increased but the trend is towards greater activity for a processing core and a voltage that is dropping, so that the clock rate can be dropped back down before the boosted level drops below its needed minimum operational voltage.

Graph 500 includes several threshold events indicated by the current in plot 511 reaching a certain level (rising above or falling below) to trigger a change in the clock frequency. Specifically, the clock is initially operating at an increased frequency (indicated by an incremental frequency delta from a base clock rate of +2) until a current increase in plot 511 crosses a first threshold current (thresh$_1$) which directs clock compressor 416 to reduce the clock frequency to a +1 delta in frequency (at Δ1). The clock frequency is maintained at the +1 level until another threshold event is encountered, namely at Δ2 which prompts clock compressor 416 to increase the clock frequency to +2 delta again. This operation continues for each threshold crossing, whether the crossing is upward or downward. However, for Δ6 and Δ7, a second threshold is crossed (thresh$_2$) which further decreases the clock frequency to a '0' delta which in this example coincides with a baseline frequency 516 ($F_{BASE}$) for the processing core. The current draw may reach a current maximum 513 ($I_{MAX}$) for the processing core, which might be determined by prior characterization of worst-case current draw. Further changes in clock frequency continue for Δ8 and beyond in a similar fashion. It should be understood that although three different incremental clock frequency changes are shown in FIG. 5, a larger or fewer quantity of increments can be employed. Moreover, a different quantity of current thresholds might be employed that corresponds to the incremental clock frequency changes.

Although a directly measured current or voltage could drive such an event, clock compressor 416 typically will use activity counters or command queues to predict that a level of activity will be falling above or below programmable cut points (individually or in some mathematical combination) to force the changes in the clock frequency as indicated. These programmable cut points can be established by programmable registers 443 and are indicated as thresholds (thresh$_1$ and thresh$_2$) in FIG. 5. Fine grained step options for the clock frequency can provide the most opportunity to leverage boosted clock rates as more time can be spent at a faster clock rate on average. For simplicity, there are only three levels of boosted clock frequencies shown in graph 500, although other quantities of levels are possible. Faster clock frequencies when activity levels are lower corresponds to more work being able to be performed in less time by a processing core. Real workloads are dominated by such power varying characteristics, and if the times during which less activity happens can be accomplished in less overall time (i.e. same number of clock cycles but with a faster clock rate), then system performance is increased.

Graph 500 attempts to reflect that the boosted or compressed clock frequencies will be incremental for each step (e.g. 1%, 1.25%, 1.5%, 2%, 2.5%, 3% or some other small step size). The voltage excursions from light loads to heavy loads are often only 50-100 mV for typical 1V supplies, and as such the frequency boost may be capped to something in the order of 5-10% maximum. This is not insignificant but also addresses the reality that a 1:1 ratio of frequency to voltage might need to be maintained for some devices, while other devices might achieve a more aggressive 1.5:1 ratio depending upon the SoC device technology and design capability. Since performance is only boosted for a portion of the time and often for less than the maximum number of steps, the average performance gain may be a few percent and will vary depending upon the workload.

It should also be noted that using accumulative activity counters (with appropriate weightings that correlate well to actual power demand) and command queue characteristics, such as how full is the queue and with what type of commands with good predictive attributes, performance from system to system can be kept consistent. For certain types of applications, this has been an important requirement, such as in gaming systems where a level playing field among users is promised to the end users. Correlation to the actual measured voltages, currents, and power levels may be used to validate the appropriate weightings are applied to the activity counters and command queues. Representative worst-case systems or devices might be the driving factor in such analysis to determine the settings used by all systems in a manufacturing environment.

To ensure there are no functional failures due to the temporary increase in frequency during runtime, on-die ring oscillators (RO) can be used to provide a max frequency (Fmax) cap in real time. This RO can be designed to fail right before the limiting timing paths of the logic of the processing cores. A pass/fail signal could be generated by an RO monitoring circuit that would flag clock compressor 416 if the RO is about to fail due to the increase in frequency. Multiple RO instances can be included, and then one can be selected based on per-part testing. This failure flag/signal could then get routed to clock compressor 416 and clock compressor 416 could employ this flag to limit how much clock compressor 416 increases the clock frequency. Since this will be monitored continuously while SoC device 410 is running and voltage/temperature is varying, this RO circuitry would give a variable Fmax that clock compressor 416 could then use to limit any end user impact and maximize the performance boost.

Although many of the example herein discuss frequency changes for a single processing core, similar processes can be applied to multi-core operation. In multi-core examples, some resources may be shared among processing cores, such as activity counters or command queues, as well as power/voltage domains and clock signals. Although some of these factors can lead or more complex workload prediction algorithms, these resource-sharing multi-core examples do not negate the use of the techniques being set forth herein. Specifically, for examples where many cores need to remain in lock step with each other (e.g. all operating at the same clock frequency), and the cores operate with a common voltage distribution network, then cumulative activity among the cores can be used in the predictive algorithms discussed herein. In this situation, the total power/current demand can be reflected in the sum of activity across all the cores that share the same resources. If the cores were powered independently with unique external supplies or on-chip regulators that are unique to each core, the cores might still need to remain in sync with each other. Then, then aggregate activity levels and/or command queues can be used need to determine when the clock frequency can be altered. Any individual core with higher activity or workloads that prompts a reduction in clock frequency from a compressed/boosted level would have to ensure that all cores make the reduction. However, if the individual cores operate independent of one another (or independently in sets/groups), then those cores can be adjusted independently.

Figure 6:
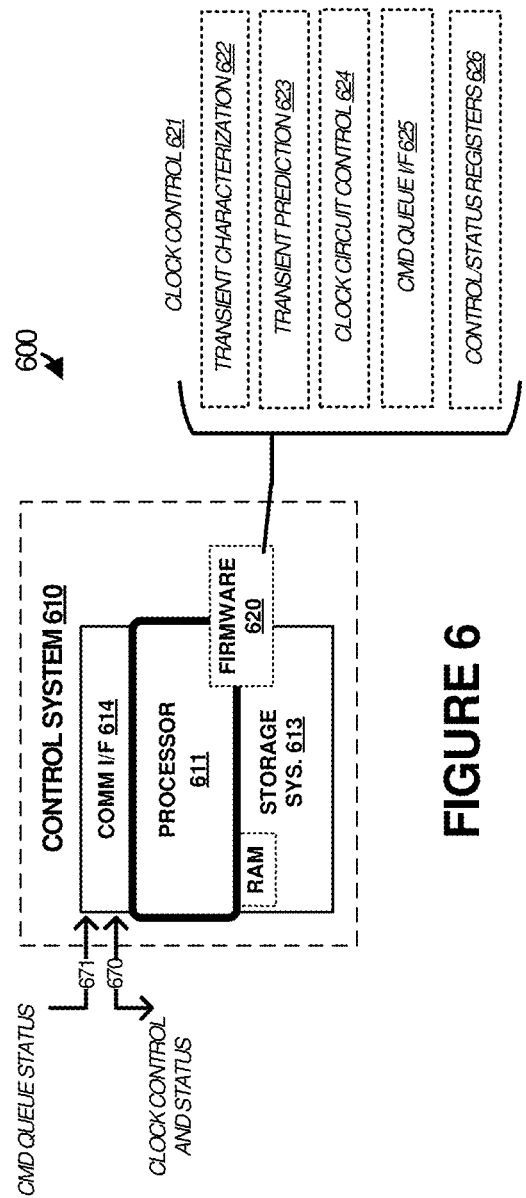
FIG. 6 illustrates a control system in an implementation.

FIG. 6 illustrates control system 610 that is representative of any system or collection of systems from which the various clock control, predictive logic, or other clock control operations can be directed. Any of the clock boost, clock compression, predictive logic, or other clock control operations employed in the operational architectures, platforms, scenarios, and processes disclosed herein may be implemented using elements of control system 610. In one implementation, control system 610 is representative of at least a portion of clock control circuitry 120 of FIG. 1, and clock compressor 416 or control core 415 of computing system 400 in FIG. 4.

Control system 610 may be implemented as a single apparatus, system, or device or may be implemented in a distributed manner as multiple apparatuses, systems, or devices. Control system 610 includes, but is not limited to, processor 611, storage system 613, communication interface system 614, and firmware 620. Processor 611 is operatively coupled with storage system 613 and communication interface system 614.

Processor 611 loads and executes firmware 620 from storage system 613. Firmware 620 includes clock control 621, which is representative of the processes discussed with respect to the preceding Figures. When executed by processor 611 to provide enhanced clock control, predictive logic, or other clock control operations for target integrated circuit devices, firmware 620 directs processor 611 to operate as described herein for at least the various processes, operational scenarios, and sequences discussed in the foregoing implementations. Control system 610 may optionally include additional devices, features, or functionality not discussed for purposes of brevity.

Referring still to FIG. 6, processor 611 may comprise a microprocessor and processing circuitry that retrieves and executes firmware 620 from storage system 613. Processor 611 may be implemented within a single processing device, but may also be distributed across multiple processing devices, sub-systems, or specialized circuitry, that cooperate in executing program instructions and in performing the operations discussed herein. Examples of processor 611 include general purpose central processing units, application specific processors, and logic devices, as well as any other type of processing device, combinations, or variations thereof.

Storage system 613 may comprise any computer readable storage media readable by processor 611 and capable of storing firmware 620. Storage system 613 may include volatile and nonvolatile, removable and non-removable media implemented in any method or technology for storage of information, such as computer readable instructions, data structures, program modules, or other data. Examples of storage media include random access memory (RAM), read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 613 may also include computer readable communication media over which at least some of firmware 620 may be communicated internally or externally. Storage system 613 may be implemented as a single storage device, but may also be implemented across multiple storage devices or sub-systems co-located or distributed relative to each other. Storage system 613 may comprise additional elements, such as a controller, capable of communicating with processor 611 or possibly other systems.

Firmware 620 may be implemented in program instructions and among other functions may, when executed by processor 611, direct processor 611 to operate as described with respect to the various operational scenarios, sequences, and processes illustrated herein. For example, firmware 620 may include program instructions for providing enhanced clock boost, clock compression, predictive logic, or clock control operations, among other operations.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Firmware 620 may include additional processes, programs, or components, such as operating system software or other application software, in addition to that of boost control 621. Firmware 620 may also comprise program code, scripts, macros, and other similar components. Firmware 620 may also comprise software or some other form of machine-readable processing instructions executable by processor 611.

In general, firmware 620 may, when loaded into processor 611 and executed, transform a suitable apparatus, system, or device (of which control system 610 is representative) overall from a general-purpose computing system into a special-purpose computing system customized to facilitate clock boost, clock compression, predictive logic, or other clock control operations for target integrated circuit devices. Encoding firmware 620 on storage system 613 may transform the physical structure of storage system 613. The specific transformation of the physical structure may depend on various factors in different implementations of this description. Examples of such factors may include, but are not limited to, the technology used to implement the storage media of storage system 613 and whether the computer-storage media are characterized as primary or secondary storage, as well as other factors.

For example, if the computer readable storage media are implemented as semiconductor-based memory, firmware 620 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Clock control 621 can include one or more software elements, such as an operating system, devices drivers, and one or more applications. These elements can describe various portions of control system 610 with which clock control elements, frequency control elements, or other elements interact. For example, an operating system can provide a software platform on which clock control 621 is executed and allows for enhanced clock boost/compression control, predictive logic, or other clock control operations for target integrated circuit devices, among other operations.

In one example, transient characterization service 622 can monitor changes in power consumption levels or voltage/current transients for one or more voltage domains of an integrated circuit device. These monitored power consumption levels can then be correlated or connected to execution of individual or sets of operations or commands by processing cores of the integrated circuit device, or correlated or connected to activity counter levels and associated information for the processing cores. Various relationships among power consumption and operations/commands can be established which can be used to predict voltage transients, current transients, or power consumption transients encountered by processing cores of an integrated circuit device levels, or for individual power domains or voltage domains of an integrated circuit device. Transient characterization service 622 can correlate transients to specific operations or commands being handled by cores of the integrated circuit device. For example, particular operations or commands might lead to a particular type of voltage transient having a magnitude and duration on one or more voltage domains. These voltage transients can comprise one or more voltage droop or rise instance per transient event, such as seen in graph 250 of FIG. 2. Over time, particular commands or sets of commands can be determined to lead to particular transients. Machine learning, artificial intelligence elements, or pattern detection algorithms might be employed by transient characterization service 622 to aid in detection and characterization of voltage transients and correlation to commands of the various cores.

Based on these characterizations, transient prediction service 623 can use live telemetry monitored for the operations pending for various cores of an integrated circuit devices to determine when voltage transients or power consumption transients might occur. Transient prediction service 623 monitors pending operations or activity counters for one or more cores, and based at least on the pending operations, predicts voltage transients or power consumption transients on at least one voltage domain that distributes a supply voltage to the one or more processing cores. Transient prediction service 623 can determine timings of clock frequency alterations (e.g. increases and decreases) for one or more clock signals provided to the affected processing cores. The predictions correspond to estimations of increased/decreased current draw, power consumption, or workloads among the one or more cores based at least in part on monitoring upcoming operations in at least a command queue or activity counter of the one or more cores.

Clock frequency alterations can then be established to have at least partial timewise overlap with the predicted transients. Moreover, incremental increases/decreases in clock frequency can be determined based on the predicted transients, as well as upper/lower limits on clock frequency alterations. Clock circuit control 624 includes elements which control clock alteration circuitry of a clock control system. Clock circuit control 624 can indicate target or desired clock frequencies or incremental frequency deltas to be provided to one or more clock domains of a target integrated circuit device, such as by instructing clock generation circuitry to alter clock frequencies provided over interface connections to the target integrated circuit device. Clock circuit control 624 can receive input from transient prediction service 623 which indicates timing on when to indicate to clock circuitry to alter clock frequencies.

Core command queue interface 625 can provide an interface between command queues or activity counters of cores of an integrated circuit device and elements of clock control 621. Core command queue interface 625 might receive indications of pending, upcoming, or present operations handled by one or more cores. Core command queue interface 625 might receive indications of quantities of pending operations in activity counters. These indications can be received over link 671, which might comprise one or more logical interfaces, physical interfaces, application programming interfaces, or software interfaces, among other interfaces.

Control/status registers 626 include one or more non-volatile memory elements which provide status of the operation of control system 610 to external elements and system over link 670. Control over the operations of control/status registers 626 can also occur via modification or alteration of values stored within control/status registers 626, or of logic-coupled ones of control/status registers 626 which tie to operation of control system 610. Reads/writes of ones of control/status registers 626 can occur over link 670 from one or more external systems, which may include a target integrated circuit device. Various example control registers might include clock circuitry frequency alteration and initiation control registers, clock circuitry status registers, manual setting of clock frequency levels or minimum/maximum clock frequency levels, as well as various identification information comprising serial numbers, model numbers, version numbers, and related information for both hardware and software elements.

Communication interface system 614 may include communication connections and devices that allow for communication over links 670 to communicate with a target integrated circuit device, as well as with control electronics, clock control systems, clock frequency adjustment circuitry, clock frequency adjustment units, clock generation circuitry, clock oscillator circuitry, ring oscillator failure indication outputs, or with external systems (not shown in FIG. 6) over one or more communication networks (not shown). Examples of connections and devices that together allow for inter-system communication may include discrete control links, system management buses, serial control interfaces, register programming interfaces, network interface cards, antennas, power amplifiers, RF circuitry, transceivers, and other communication circuitry. The connections and devices may communicate over communication media to exchange packetized communications with other computing systems or networks of systems, such as metal, glass, air, or any other suitable communication media. Communication interface system 614 may include user interface elements, such as programming registers, control/status registers 626, APIs, or other user-facing control and status elements.

Communication between control system 610 and other circuitry and systems (not shown in FIG. 6), may occur over links 670-671 comprising one or more communication links or communication networks, and in accordance with various communication protocols, combinations of protocols, or variations thereof. These other systems can include target integrated circuit devices, power control systems, or manufacturing systems, among others. Communication interfaces might comprise system management bus (SMBbus) interfaces, inter-integrated circuit (I2C) interfaces, or other similar interfaces. Further examples include intranets, internets, the Internet, local area networks, wide area networks, wireless networks, wired networks, virtual networks, software defined networks, data center buses, computing backplanes, or any other type of network, combination of network, or variation thereof. Some example communication protocols that may be used include, but are not limited to, the Internet protocol (IP, IPv4, IPv6, etc.), the transmission control protocol (TCP), and the user datagram protocol (UDP), as well as any other suitable communication protocol, variation, or combination thereof.

Certain inventive aspects may be appreciated from the foregoing disclosure, of which the following are various examples.

Example 1: A method of operating an integrated circuit device, comprising monitoring indications of pending operations for a processing core of an integrated circuit, and determining a predicted change in workload for the processing core based at least on a portion of the indications of the pending operations. The method includes altering a clock frequency of a clock signal provided to the processing core based at least on the predicted change in the workload.

Example 2: The method of Example 1, where the predicted change in the workload corresponds to a decreased workload for the processing core initiating a rise in supply voltage applied to the processing core, and further comprising increasing the clock frequency in accordance with the rise in the supply voltage.

Example 3: The method of Examples 1-2, further comprising reducing the clock frequency responsive to the predictive change in the workload indicating an increased workload for the processing core above a threshold workload initiating a fall in the supply voltage.

Example 4: The method of Examples 1-3, where the indications of the pending operations are determined from at least one among activity counters and command queues for the processing core.

Example 5: The method of Examples 1-4, further comprising monitoring a plurality of the indications of the pending operations over a period of time to derive workload predictions for the processing core based at least on patterns between changes in power consumption for the processing core and corresponding pending operations.

Example 6: The method of Examples 1-5, further comprising applying individual weightings to the pending operations to establish predicted power draw of each of the pending operations, and combining the predicted power draw of ones of the pending operations to determining the predicted change in the workload for the processing core.

Example 7: The method of Examples 1-6, further comprising operating the processing core with at least one supply voltage having a voltage margin below a manufacturer specified voltage level, and determining magnitudes of incremental increases in the clock frequency of the clock signal based at least on the voltage margin.

Example 8: The method of Examples 1-7, further comprising determining at least one frequency limit for incremental increases of the clock frequency based at least on monitoring operation of a ring oscillator for failure indications.

Example 9: The method of Examples 1-8, further comprising establishing one or more power consumption thresholds for the processing core, where each power consumption threshold corresponds to a different workload level for the processing core. Based on the predicted change in the workload indicating power consumption of the processing core is projected to fall below a first power consumption threshold, the method includes increasing the clock frequency by a predetermined amount approximately commensurate in time with the power consumption falling below the first power consumption threshold. Based on the power consumption initially falling below the first power consumption threshold and the predicted change in the workload subsequently indicating the power consumption is projected to rise above a second power consumption threshold, the method includes decreasing the clock frequency by the predetermined amount approximately commensurate in time with the power consumption rising above the second power consumption threshold.

Example 10: The method of Examples 1-9, further comprising determining the predicted change in workload for the processing core using at least a control core included on a semiconductor die comprising the processing core. In the control core, the method includes instructing clock generation circuitry to alter the clock frequency of the clock signal provided to the processing core.

Example 11: A circuit, comprising a processing core, and a control circuit. The control circuit is configured to monitor indications of pending operations for the processing core, determine a predicted change in workload for the processing core based at least on a portion of the indications of the pending operations, and alter a clock frequency of a clock signal provided to the processing core based at least on the predicted change in the workload.

Example 12: The circuit of Example 11, where the predicted change in the workload corresponds to a decreased workload for the processing core initiating a rise in supply voltage applied to the processing core, and comprising the control circuit configured to increase the clock frequency in accordance with the rise in the supply voltage.

Example 13: The circuit of Examples 11-12, comprising the control circuit configured to reduce the clock frequency responsive to the predictive change in the workload indicating an increased workload for the processing core above a threshold workload initiating a fall in the supply voltage.

Example 14: The circuit of Examples 11-13, where the indications of the pending operations are determined from at least one among activity counters and command queues for the processing core.

Example 15: The circuit of Examples 11-14, comprising the control circuit configured to monitor a plurality of the indications of the pending operations over a period of time to derive workload predictions for the processing core based at least on patterns between changes in power consumption for the processing core and corresponding pending operations. The control circuit is configured to apply individual weightings to the pending operations to establish predicted power draw of each of the pending operations, and combine the predicted power draw of ones of the pending operations to determining the predicted change in the workload for the processing core.

Example 16: The circuit of Examples 11-15, comprising the control circuit configured to establish one or more power consumption thresholds for the processing core, where each power consumption threshold corresponds to a different workload level for the processing core. Based on the predicted change in the workload indicating power consumption of the processing core is projected to fall below a first power consumption threshold, the control circuit is configured to increase the clock frequency by a predetermined amount approximately commensurate in time with the power consumption falling below the first power consumption threshold. Based on the power consumption initially falling below the first power consumption threshold and the predicted change in the workload subsequently indicating the power consumption is projected to rise above a second power consumption threshold, the control circuit is configured to decrease the clock frequency by the predetermined amount approximately commensurate in time with the power consumption rising above the second power consumption threshold.

Example 17: The circuit of Examples 11-16, comprising the control circuit comprising a control core included on a semiconductor die comprising the processing core, and the control core configured to determine the predicted change in workload for the processing core using at least a control core, and instruct clock generation circuitry to alter the clock frequency of the clock signal provided to the processing core.

Example 18: A system-on-a-chip (SoC) device, comprising a plurality of processing cores, and a clock control circuit. The clock control circuit is configured to monitor indications of pending operations for the plurality of processing cores, and determine a predicted change in power consumption for at least one processing core based at least on a portion of the indications of the pending operations. Responsive to the predicted change in the power consumption indicating a decreased power consumption, the clock control circuit is configured to initiating an increase in a clock frequency of a clock signal provided to the at least one processing core.

Example 19: The SoC device of Example 18, comprising the clock control circuit configured to monitor a plurality of the indications of the pending operations over a period of time to derive workload predictions for the at least one processing core based at least on patterns between changes in the power consumption for the at least one processing core and corresponding pending operations. The clock control circuit is configured to apply individual weightings to the pending operations to establish predicted power draw of each of the pending operations, and combine the predicted power draw of ones of the pending operations to determining the predicted change in the power consumption for the at least one processing core.

Example 20: The SoC device of Examples 18-19, comprising the clock control circuit configured to establish one or more power consumption thresholds for the at least one processing core, where each power consumption threshold corresponds to a different workload level for the at least one processing core. Based on the predicted change in the power consumption indicating the power consumption of the at least one processing core is projected to fall below a first power consumption threshold, the clock control circuit is configured to initiating increase of the clock frequency by a predetermined amount approximately to coincide with the power consumption falling below the first power consumption threshold. Based on the power consumption initially falling below the first power consumption threshold and the predicted change in the workload subsequently indicating the power consumption is projected to rise above a second power consumption threshold, the clock control circuit is configured to decrease the clock frequency by at least the predetermined amount to approximately coincide with the power consumption rising above the second power consumption threshold.

The functional block diagrams, operational scenarios and sequences, and flow diagrams provided in the Figures are representative of exemplary systems, environments, and methodologies for performing novel aspects of the disclosure. The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method, comprising:
  monitoring indications of pending operations for a processing core of an integrated circuit;
  determining a predicted change in workload for the processing core based at least on a portion of the indications of the pending operations;
  establishing one or more power consumption thresholds for the processing core, wherein each power consumption threshold corresponds to a different workload level for the processing core;
  based on the predicted change in the workload indicating power consumption of the processing core is projected to fall below a first power consumption threshold, increasing a clock frequency of a clock signal provided to the processing core by a predetermined amount approximately commensurate in time with the power consumption falling below the first power consumption threshold; and
  based on the power consumption initially falling below the first power consumption threshold and the predicted change in the workload subsequently indicating the power consumption is projected to rise above a second power consumption threshold, decreasing the clock frequency by the predetermined amount approximately commensurate in time with the power consumption rising above the second power consumption threshold.

2. The method of claim 1, wherein the predicted change in the workload corresponds to a decreased workload for the processing core initiating a rise in supply voltage applied to the processing core, and further comprising:
  increasing the clock frequency in accordance with the rise in the supply voltage.

3. The method of claim 2, further comprising:
  reducing the clock frequency responsive to the predicted change in the workload indicating an increased workload for the processing core above a threshold workload initiating a fall in the supply voltage.

4. The method of claim 1, wherein the indications of the pending operations are determined from at least one among activity counters and command queues for the processing core.

5. The method of claim 1, further comprising:
monitoring a plurality of the indications of the pending operations over a period of time to derive workload predictions for the processing core based at least on patterns between changes in power consumption for the processing core and corresponding pending operations.

6. The method of claim 5, further comprising:
applying individual weightings to the pending operations to establish predicted power draw of each of the pending operations; and
combining the predicted power draw of ones of the pending operations to determining the predicted change in the workload for the processing core.

7. The method of claim 1, further comprising:
operating the processing core with at least one supply voltage having a voltage margin below a manufacturer specified voltage level; and
determining magnitudes of incremental increases in the clock frequency of the clock signal based at least on the voltage margin.

8. The method of claim 1, further comprising:
determining at least one frequency limit for incremental increases of the clock frequency based at least on monitoring operation of a ring oscillator for failure indications.

9. The method of claim 1, further comprising:
determining the predicted change in workload for the processing core using at least a control core included on a semiconductor die comprising the processing core; and
in the control core, instructing clock generation circuitry to alter the clock frequency of the clock signal provided to the processing core.

10. A circuit, comprising:
a processing core; and
a control circuit configured to:
monitor indications of pending operations for the processing core;
determine a predicted change in workload for the processing core based at least on a portion of the indications of the pending operations;
establish one or more power consumption thresholds for the processing core, wherein each power consumption threshold corresponds to a different workload level for the processing core;
based on the predicted change in the workload indicating power consumption of the processing core is projected to fall below a first power consumption threshold, increase a clock frequency by a predetermined amount approximately commensurate in time with the power consumption falling below the first power consumption threshold; and
based on the power consumption initially falling below the first power consumption threshold and the predicted change in the workload subsequently indicating the power consumption is projected to rise above a second power consumption threshold, decrease the clock frequency by the predetermined amount approximately commensurate in time with the power consumption rising above the second power consumption threshold.

11. The circuit of claim 10, wherein the predicted change in the workload corresponds to a decreased workload for the processing core initiating a rise in supply voltage applied to the processing core, and comprising:
the control circuit configured to increase the clock frequency in accordance with the rise in the supply voltage.

12. The circuit of claim 11, comprising:
the control circuit configured to reduce the clock frequency responsive to the predicted change in the workload indicating an increased workload for the processing core above a threshold workload initiating a fall in the supply voltage.

13. The circuit of claim 10, wherein the indications of the pending operations are determined from at least one among activity counters and command queues for the processing core.

14. The circuit of claim 10, comprising:
the control circuit configured to:
monitor a plurality of the indications of the pending operations over a period of time to derive workload predictions for the processing core based at least on patterns between changes in power consumption for the processing core and corresponding pending operations;
apply individual weightings to the pending operations to establish predicted power draw of each of the pending operations; and
combine the predicted power draw of ones of the pending operations to determining the predicted change in the workload for the processing core.

15. The circuit of claim 10, comprising:
the control circuit comprising a control core included on a semiconductor die comprising the processing core; and
the control core configured to determine the predicted change in workload for the processing core using at least a control core, and instruct clock generation circuitry to alter the clock frequency of a clock signal provided to the processing core.

16. A processing device, comprising:
a plurality of processing cores, wherein at least one of the processing cores is operated with at least one supply voltage having a voltage margin below a manufacturer specified voltage level; and
a clock control circuit, the clock control circuit configured to:
monitor indications of pending operations for the plurality of processing cores;
determine a predicted change in power consumption for the at least one of the processing core based at least on a portion of the indications of the pending operations; and
responsive to the predicted change in the power consumption indicating a decreased power consumption, initiating an increase in a clock frequency of a clock signal provided to the at least one processing core, wherein a magnitude of the increase in the clock frequency is determined based at least on the voltage margin.

17. The processing device of claim 16, comprising:
the clock control circuit configured to:
monitor a plurality of the indications of the pending operations over a period of time to derive workload predictions for the at least one processing core based at least on patterns between changes in the power consumption for the at least one processing core and corresponding pending operations;

apply individual weightings to the pending operations to establish predicted power draw of each of the pending operations; and combine the predicted power draw of ones of the pending operations to determining the predicted change in the power consumption for the at least one processing core.

18. The processing device of claim 16, comprising:

the clock control circuit configured to:

establish one or more power consumption thresholds for the at least one processing core, wherein each power consumption threshold corresponds to a different workload level for the at least one processing core;

based on the predicted change in the power consumption indicating the power consumption of the at least one processing core is projected to fall below a first power consumption threshold, initiating increase of the clock frequency by a predetermined amount to approximately coincide with the power consumption falling below the first power consumption threshold; and based on the power consumption initially falling below the first power consumption threshold and the predicted change in the workload subsequently indicating the power consumption is projected to rise above a second power consumption threshold, decrease the clock frequency by at least the predetermined amount to approximately coincide with the power consumption rising above the second power consumption threshold.

\* \* \* \* \*